(12) United States Patent
Marsetz et al.

(10) Patent No.: US 12,155,268 B2
(45) Date of Patent: Nov. 26, 2024

(54) ELECTRICAL MACHINE HAVING DEFINED POSITIONING OF VARIOUS RECESSES IN A WET-RUNNING STATOR

(71) Applicant: Schaeffler Technologies AG & Co. KG, Herzogenaurach (DE)

(72) Inventors: Michael Marsetz, Ettlingen (DE); Christian Ludwig, Bühl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 283 days.

(21) Appl. No.: 17/641,145

(22) PCT Filed: Aug. 26, 2020

(86) PCT No.: PCT/DE2020/100752
§ 371 (c)(1),
(2) Date: Mar. 8, 2022

(87) PCT Pub. No.: WO2021/047729
PCT Pub. Date: Mar. 18, 2021

(65) Prior Publication Data
US 2022/0286002 A1    Sep. 8, 2022

(30) Foreign Application Priority Data
Sep. 10, 2019    (DE) .................. 10 2019 124 256.8

(51) Int. Cl.
*H02K 1/20* (2006.01)
*B60K 1/00* (2006.01)
*H02K 9/19* (2006.01)
(52) U.S. Cl.
CPC .............. *H02K 1/20* (2013.01); *H02K 9/19* (2013.01); *B60K 1/00* (2013.01); *B60K 2001/006* (2013.01)

(58) Field of Classification Search
CPC ............ H02K 1/20; H02K 9/19; H02K 9/193; H02K 9/197; B60K 2001/006; B60K 1/00
See application file for complete search history.

(56) References Cited

U.S. PATENT DOCUMENTS

| 2008/0100159 A1 | 5/2008 | Dawsey et al. |
| 2016/0118857 A1 | 4/2016 | Jeong et al. |
| (Continued) | | |

FOREIGN PATENT DOCUMENTS

| CN | 106953436 A | 7/2017 |
| CN | 208094306 U | 11/2018 |
| (Continued) | | |

OTHER PUBLICATIONS

Goemmel, Machine Translation of EP2814139, Dec. 2014 (Year: 2014).*

(Continued)

*Primary Examiner* — Eric Johnson
(74) *Attorney, Agent, or Firm* — Volpe Koenig

(57) ABSTRACT

An electrical machine for driving a motor vehicle includes a housing, a stator, which is fixedly accommodated in the housing, and a rotor, which is mounted rotatably relative to the stator. The stator has a laminated core composed of a plurality of punched lamination segments and has a wire winding region connected to the laminated core. Each lamination segment has, on its radial exterior, at least one radial recess also created by means of the punching production. A coolant guide channel is delimited directly by an outer periphery of the laminated core. A recess of a first lamination segment is spaced apart, along the outer periphery, from a recess of a second lamination segment directly abutting the first lamination segment in such a way that the recess of the first lamination segment is at least partly axially covered by an end face of the second lamination segment.

10 Claims, 7 Drawing Sheets

(56) References Cited

U.S. PATENT DOCUMENTS

2020/0112226 A1* 4/2020 Kozarekar ............ H02K 15/024
2020/0227977 A1* 7/2020 Bradfield ................ H02K 9/00

FOREIGN PATENT DOCUMENTS

| DE | 19851439 A1 | | 3/2000 | | |
|----|---|---|---|---|---|
| DE | 102012017293 A1 | | 2/2014 | | |
| EP | 2814139 A1 | * | 12/2014 | ............... | H02K 1/16 |
| JP | 2019022368 A | * | 2/2019 | | |
| WO | WO-2020177411 A1 | * | 9/2020 | | |

OTHER PUBLICATIONS

Zhou, Machine Translation of WO2020177411, Sep. 2020 (Year: 2020).*
Kono, Machine Translation of JP2019022368, Feb. 2019 (Year: 2019).*

* cited by examiner

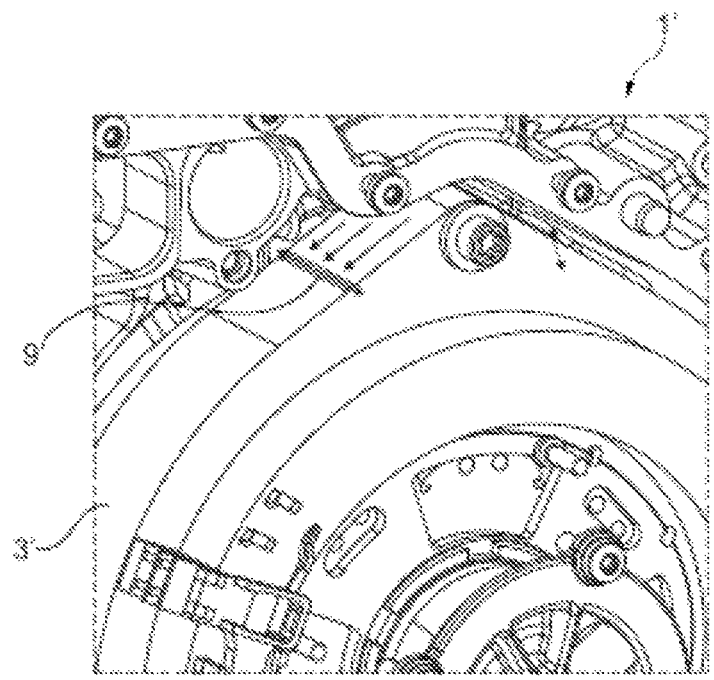
Fig. 13 - Prior Art

ELECTRICAL MACHINE HAVING DEFINED POSITIONING OF VARIOUS RECESSES IN A WET-RUNNING STATOR

CROSS-REFERENCE TO RELATED APPLICATIONS

This application is the U.S. National Phase of PCT Appln. No. PCT/DE2020/100752 filed Aug. 26, 2020, which claims priority to DE 102019124256.8 filed Sep. 10, 2019, the entire disclosures of which are incorporated by reference herein.

TECHNICAL FIELD

The disclosure relates to an electrical machine for driving a (purely electric or hybrid) motor vehicle, such as a car, truck, bus or other commercial vehicle, comprising a housing, a stator, which is fixedly accommodated in the housing, and a rotor, which is mounted rotatably relative to the stator, wherein the stator has a laminated core composed of a plurality of punched lamination segments and has a wire winding region connected to the laminated core, and each lamination segment has, on its radial exterior, at least one radial recess also created by means of the punching production and wherein a coolant guide channel is delimited directly by an outer periphery of the laminated core.

BACKGROUND

Electrical machines of this type are already sufficiently known from the background of the art. For an exemplary embodiment of an electrical machine 1' according to the background of the art, reference is made to FIG. 13. During the manufacture of the stator 3' used in this electrical machine 1', several notches are formed which run continuously in the longitudinal direction of the stator 3'. However, it has been found to be disadvantageous that these notches act as a collecting channel for the coolant flowing over the outer periphery of stator 3' during operation and consequently divert the coolant axially. This has the disadvantage that the regions of the stator lying radially inside these notches are not cooled at all or only inadequately.

SUMMARY

It is therefore the object of the present disclosure to remedy the disadvantages known from the background of the art and, in particular, to improve a cooling system of an electrical machine to increase the efficiency.

According to the disclosure, this is achieved in that a recess of a first lamination segment is spaced along the outer periphery relative to a recess of a second lamination segment directly abutting the first lamination segment in such a way that the recess of the first lamination segment is at least partially axially covered by an end face of the second lamination segment.

Such a distribution of the recesses of the different lamination segments makes it more difficult for the coolant flowing along the outer periphery during operation to flow off axially. Thus, a larger portion of coolant reaches the regions of the stator located below the recess. This increases the amount of heat dissipated and contributes to a higher performance of the electrical machine.

Further advantageous embodiments are claimed and explained in more detail below.

If the first lamination segment consists of a single individual lamination or several individual laminations stacked one on top of the other to form a partial stack and/or if the second lamination segment consists of a single individual lamination or several individual laminations stacked one on top of the other to form a partial stack, the assembly effort of the stator is further optimized.

It is also expedient if the at least one individual lamination is formed from an electrical sheet. The at least one individual lamination preferably has a thickness of less than 1 mm.

In order to prevent the coolant from flowing off axially even more effectively, it is also advantageous if a third lamination segment likewise provided with a recess is present, which abuts on an axial side of the first lamination segment facing away from the second lamination segment, wherein the recess of the third lamination segment is spaced apart along the outer periphery relative to the recess of the first lamination segment such that the recess of the first lamination segment is axially covered by an end face of the third lamination segment.

In this context, too, it is advantageous if the third lamination segment comprises a single individual lamination or a plurality of individual laminations stacked one on top of the other to form a partial stack.

Furthermore, it is expedient if the individual laminations of the different lamination segments are designed as identical parts, wherein the at least one individual lamination of the first lamination segment is rotated relative to the at least one individual lamination of the second lamination segment. This keeps the manufacturing effort for the laminated core as low as possible.

If each lamination segment is even provided with several (preferably four) recesses arranged (unevenly) distributed along the circumference, wherein each recess of the respective lamination segment is arranged along the circumference spaced apart from the individual recesses of the immediately adjacent lamination segment, the different recesses caused by the punching production are skillfully positioned relative to one another in the circumferential direction. This further improves coolant distribution.

Furthermore, it is useful if a plurality of (axial) first through-holes distributed along the periphery is provided in the laminated core, wherein the at least one recess of the first lamination segment has a greater distance along the outer periphery from the first through-hole than the at least one recess of the second lamination segment. The respective individual lamination thus preferably has a number of recesses, at least two of which, and more preferably three, are at different distances from the through-holes nearest to them. This results in an adept, uneven distribution of the recesses along the outer periphery.

In this context, it is also advantageous if the at least one recess of the first lamination segment has a greater distance along the outer periphery to the through-hole nearest thereto than the at least one recess of the third lamination segment.

If there are more than three lamination segments, preferably five or six, each of which preferably consists of a partial stack comprising several individual laminations, the stator can be implemented in a particularly efficient manner.

Furthermore, it is advantageous for the distribution of the coolant if the recess of the respective lamination segment has a depth (radial extent) that measures less than 60%, more preferably less than 50%, of its width (extent along the outer periphery). This further reduces the tendency of the coolant to adhere/accumulate within the respective recess.

In other words, a positioning of notches on wet-running stators to ensure cooling is realized according to the disclosure. In principle, two approaches are proposed to improve oil distribution along the outer edge of the laminated core. One way to avoid continuous longitudinal notches is by uneven distribution of the notches (/recesses) on the outer edge during the punching process of the sheet by following the punching process with a rotation of the sheet during assembly to achieve isolated recesses instead of longitudinal notches. Optimizing the position of these notches can improve fluid flow toward the center of the outer periphery of the laminated core. Another solution is to make the notches shallower and wider to prevent coolant from accumulating and capillary forces from developing in the notches.

BRIEF DESCRIPTION OF THE DRAWINGS

The disclosure is now explained in more detail below with reference to figures, in which context various exemplary embodiments are also shown.
In the Figures:

FIG. 13 shows a perspective view of an electrical machine according to the background of the art.

The figures are only schematic in nature and serve only for understanding the disclosure. The same elements are provided with the same reference symbols. Furthermore, the various features of the different exemplary embodiments can in principle be freely combined with one another.

DETAILED DESCRIPTION

Figures 1, 2:
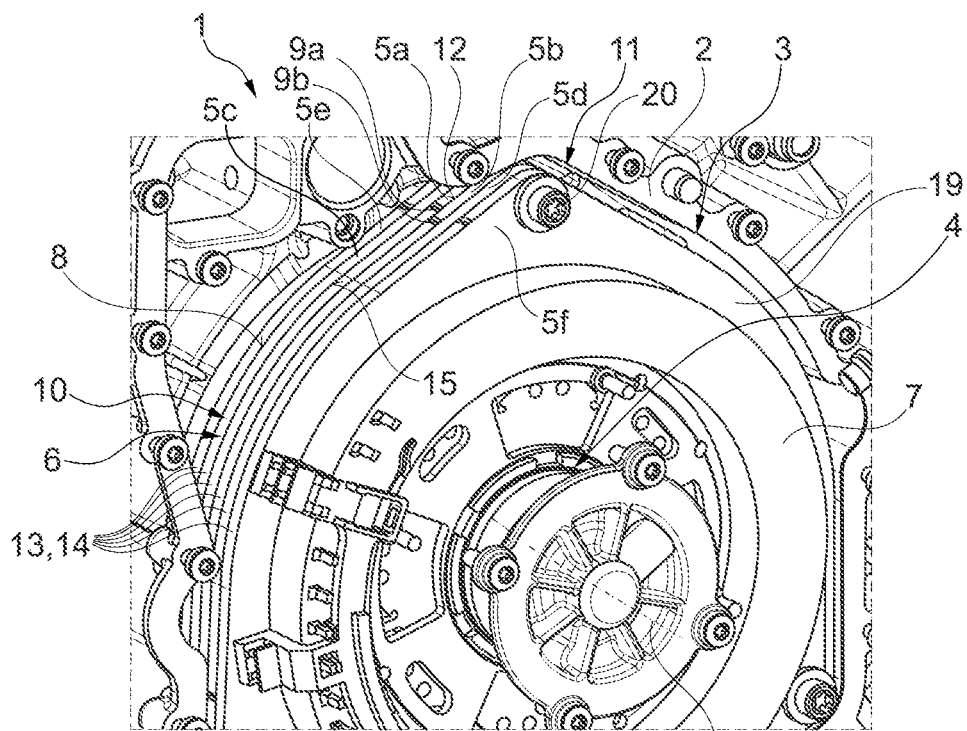
FIG. 1 shows a perspective view of a region of an electrical machine according to a first exemplary embodiment, in which an outer periphery of a stator is clearly visible.
FIG. 2 shows a perspective view of the electrical machine, similar to FIG. 1, wherein arrows are additionally drawn to illustrate a flow direction of the coolant conducted over the outer periphery during operation.

FIG. 1 illustrates the basic structure of an electrical machine 1 according to the disclosure. The electrical machine 1 provided in FIG. 1 according to a first exemplary embodiment is preferably used in its operation as a drive unit of a motor vehicle. The electrical machine 1 has a housing 2, which is shown in section in FIG. 1. A stator 3 is mounted in the housing 2 in such a way that it is fixed to the housing. Radially inside the annular stator 3, a rotor 4 of the electrical machine 1 is arranged. The rotor 4 is rotatably mounted relative to the stator 3 and is further connected to a corresponding shaft of the motor vehicle in operation.

An axis of rotation of the rotor 4 is indicated in FIG. 1 by the reference symbol 17. The directions used here axially, radially and along a circumference/in circumferential direction refer to this axis of rotation 17. Accordingly, the axial direction is a direction along the axis of rotation 17, a radial direction is a direction perpendicular to the axis of rotation 17, and a circumferential direction is a direction along a circular line running coaxially with the axis of rotation 17 or a circumferential line running around the axis of rotation 17.

Figure 7:
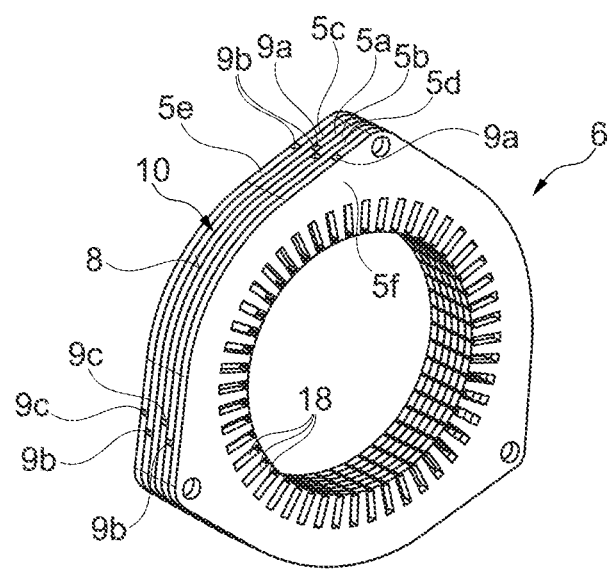
FIG. 7 shows a perspective view of a laminated core of the stator inserted in FIGS. 1 to 5.

As shown in more detail in FIG. 7, the stator 3 has a laminated core 6 as the base body. This laminated core 6 consists of several individual laminations 13 stacked on top of each other and designed as identical parts. In this embodiment, the individual laminations 13, each of which is formed with a thickness of less than 1 mm, cannot be identified individually but are shown combined into partial stacks 14 for the sake of simplicity. A total of six partial stacks 14 are shown by way of example in this embodiment, wherein each partial stack 14 comprises a plurality of individual laminations 13 (preferably the same number of individual laminations 13) and is designated as lamination segment 5a, 5b. 5c, 5d, 5e, 5f below.

Figure 4:
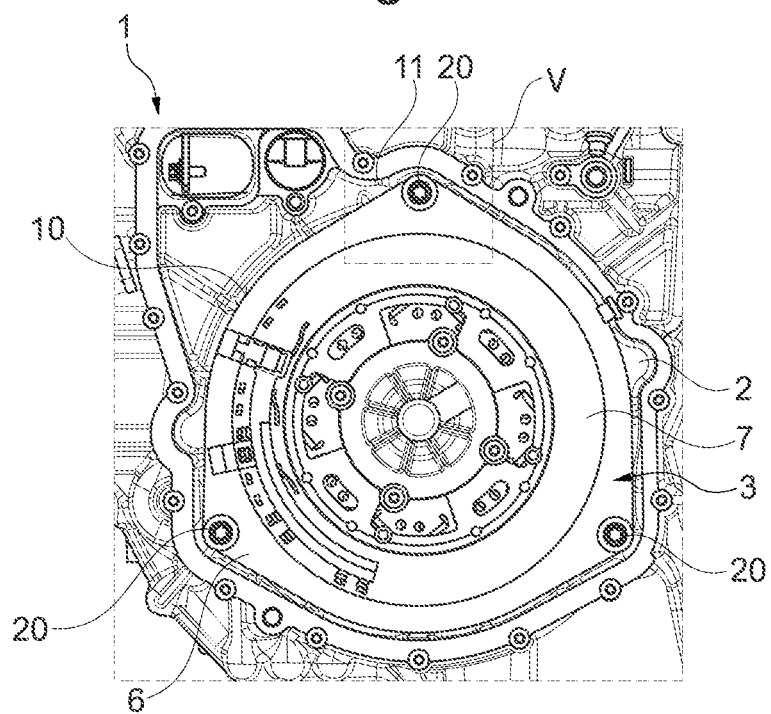
FIG. 4 shows a front view of the electrical machine according to the disclosure.
Figure 9:
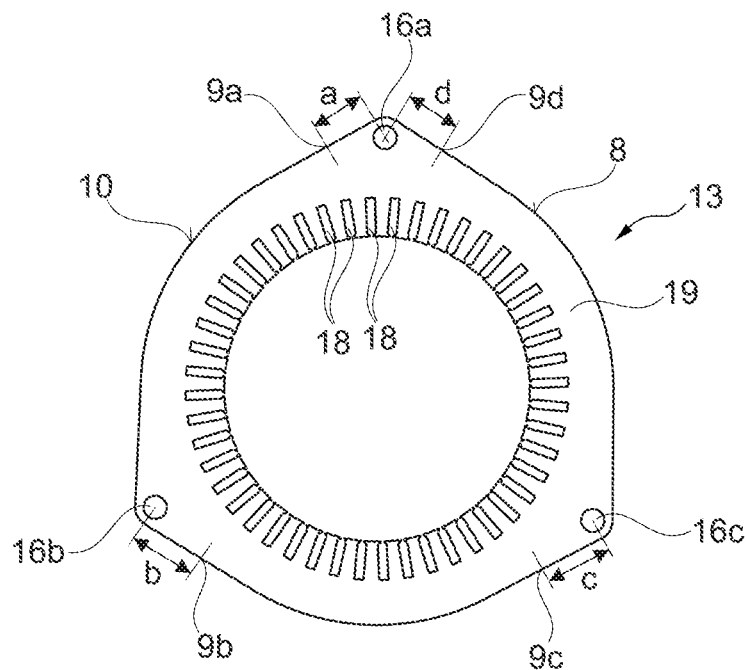
FIG. 9 shows a front view of an individual lamination used to form the laminated core of the first exemplary embodiment.

An individual lamination 13 can also be seen in an exemplary manner in FIG. 9. The individual lamination 13 has an annular extension. Towards its radially inner side, the individual lamination 13 has several radially running slots 18 through which several wire windings of a wire winding region 7 run in the fully assembled state of the stator 3. A circumferentially continuous annular region 19 runs radially outside the slots 18. Towards its radial exterior, the annular region 19 is provided with a plurality of through-holes 16a, 16b, 16c distributed in the circumferential direction. In the finally finished stacked state of the laminated core 6, the respective through-holes 16a, 16b, 16c of the different individual laminations 13 are aligned with one another in the axial direction in order to be firmly connected to the housing 2 via fastening means 20 (screws), as can also be seen in FIG. 4.

Figure 12:
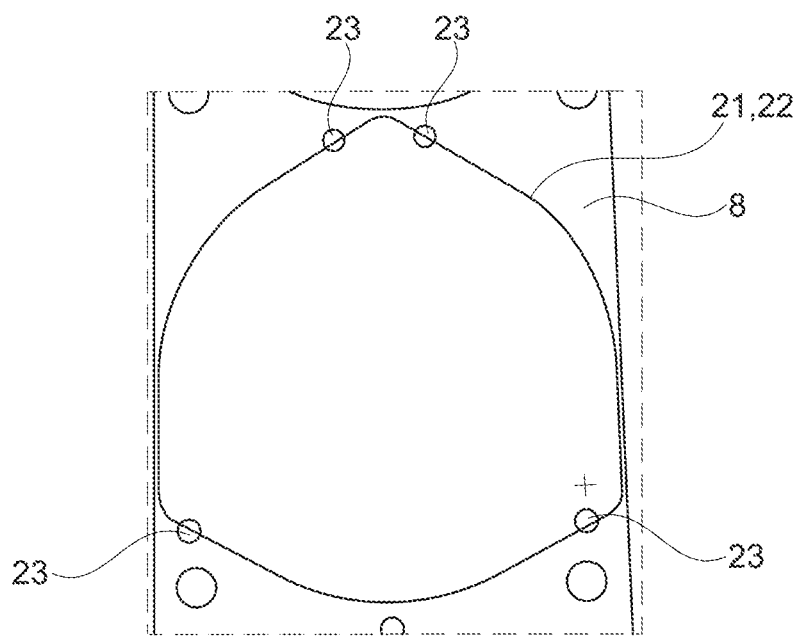
FIG. 12 shows a top view of a section of a sheet metal blank with the individual lamination indicated on its outer contour.

In connection with FIG. 12, the actual forming of the respective individual lamination 13 is shown. In FIG. 12, a sheet metal blank 21 in the form of a sheet metal strip 22/coil can be seen. The individual lamination 13, of which a radial exterior contour/exterior 8 is pre-drawn as a punched edge in FIG. 12, is punched out of this sheet metal strip 22. In a punching operation, the individual lamination 13 is only mostly punched out of the sheet metal strip 22 in a typical manner. At several points marked with the reference symbol 23, the individual lamination 13 is then still attached to the remaining sheet metal blank 21. Only following that is the individual lamination 13 completely cut out. During this cutting process, corresponding recesses 9a, 9b, 9c, 9d are formed in the individual lamination 13 in the form of indentations/notches distributed in the circumferential direction. In this regard, it should be noted that the points 23 in FIG. 12 are drawn arbitrarily to illustrate the general demolding process and do not correspond to the distribution according to the disclosure, as then shown in more detail in conjunction with FIGS. 1 to 5 and 7.

Returning to FIG. 1, the wire winding region 7 is schematically shown as an annular region. The wire winding region 7 extends beyond the laminated core 6 on both axial sides thereof and is joined substantially radially within the annular region 19.

In FIG. 1, the various recesses 9a, 9b, 9c, 9d of the individual laminations 13 emerge from the common recesses 9a, 9b, 9c. 9d of a lamination segment 5a, 5b, 5c, 5d, 5e, 5f. The recesses 9a, 9b, 9c, 9d are arranged on the respective lamination segment 5a, 5b, 5c, 5d, 5e, 5f unevenly distributed over the circumference, i.e., distributed at different angular distances in the circumferential direction with respect to the axis of rotation 17. This is also clearly shown in FIG. 9: Accordingly, a first recess 9a is designed to be spaced apart a first distance a from the first through-hole 16a nearest thereto along an outer periphery 10 of the laminated core 6. A second recess 9b is arranged at a second distance b from the second through-hole 16b nearest thereto. A third recess 9c is positioned at a third distance c from the third through-hole 16c nearest thereto. The fourth recess 9d is spaced apart a fourth distance d from the first through-hole 16a nearest thereto. In this embodiment, the first distance a and the fourth distance d are chosen to be the same. The second distance b and the third distance c are different from one another and from the distances a and d.

While the individual laminations 13 of the same lamination segment 5a, 5b, 5c, 5d, 5e, 5f are each aligned axially flush with their recesses 9a, 9b, 9c, 9d, the various lamination segments 5a, 5b, 5c, 5d, 5e, 5f are arranged in a manner rotated relative to one another. This rotated arrangement results, as can be seen again in FIG. 1, in a first recess 9a of a first lamination segment 5a being spaced apart in the circumferential direction/along the outer periphery 10 from the second recess 9b of the second lamination segment 5b and spaced apart from the recesses 9a, 9b, 9c, 9d of a third lamination segment 5c. Accordingly, the first recess 9a of the first lamination segment 5a is closed off to its two axial sides by a respective end face 12, 15 of the second lamination segment 5b and the third lamination segment 5c, respectively. This results in an axially closed first recess 9a in the sense of a trough, as can also be readily seen in connection with FIGS. 2 and 3. This first recess 9a then collects a coolant that is directed along the outer periphery 10 during operation and does not run directly out from the bottom of the first recess 9a toward the axial sides of the first recess 9a. This arrangement of the first recess 9a of the first lamination segment 5a also applies to the other recesses 9b, 9c, 9d. The recesses 9a, 9b, 9c, 9d of the further lamination segments 5b, 5c and 5d are also axially closed in this manner. Only the lamination segments 5e and 5f arranged at the axial ends are open towards one axial side. Coolant continues to flow from the recesses 9a, 9b, 9c, 9d of the fifth and sixth lamination segments 5e and 5f onto the radial exterior of the wire winding region 7.

Figure 5:
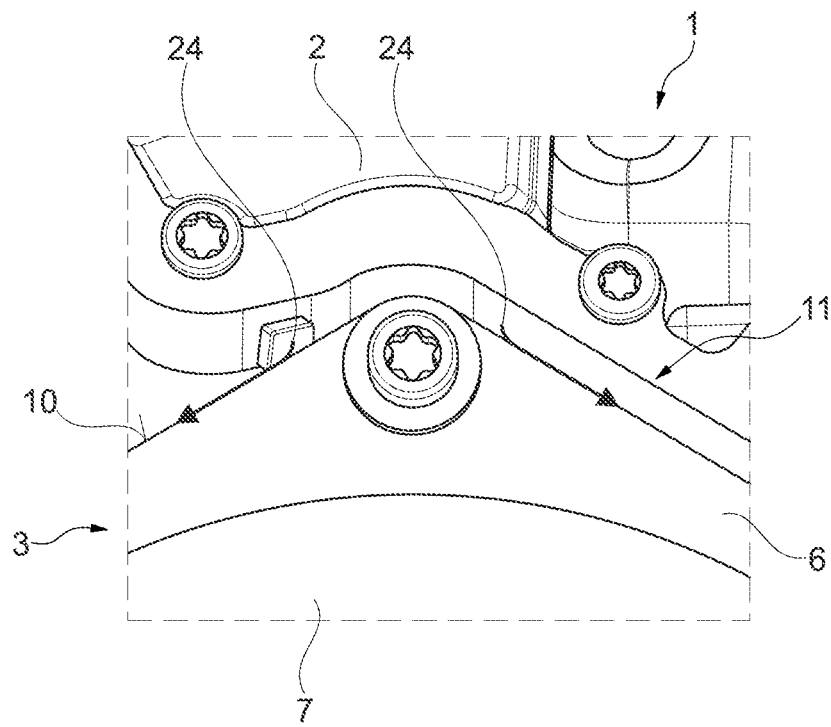
FIG. 5 shows a detailed view of the region marked "V" in FIG. 4.

FIG. 5 shows a supply channel 24 of the coolant guide channel 11 running through the housing 2 and conducting the coolant directly along the laminated core 6. A coolant entering the inside from the exterior of the housing 2 is guided directly along the laminated core 6 through the coolant guide channel 11 formed between the outer periphery 10 and the housing 2, so that the stator 3 is directly wet-running/directly liquid-cooled.

Figure 6:
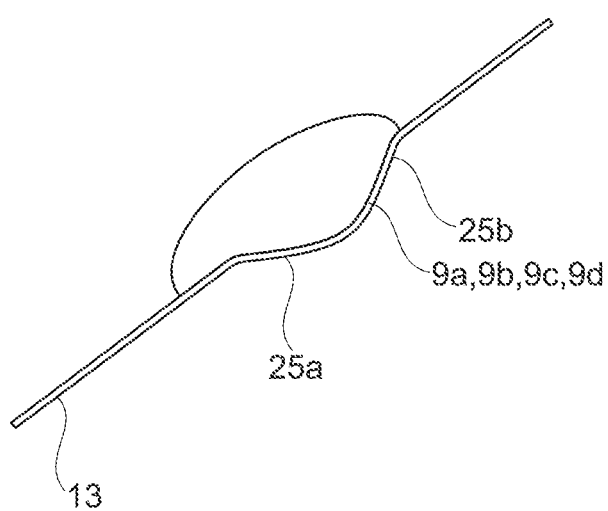
FIG. 6 shows a side view of a circumferential portion of an individual lamination having a recess, as inserted into a stator as shown in FIGS. 1 to 5.

FIG. 6 shows a preferred shape of the respective recess 9a, 9b, 9c, 9d. It can be clearly seen here that each recess 9a, 9b, 9c, 9d forms a shallow/obtuse angle with its peripheral ramp surfaces 25a, 25b. In particular, each recess 9a. 9b. 9c, 9d has a depth (radial extent) that measures less than half of a width, i.e., a circumferential extent. This prevents excessive accumulation of coolant in the recess 9a, 9b, 9c, 9d during operation.

Figure 8:
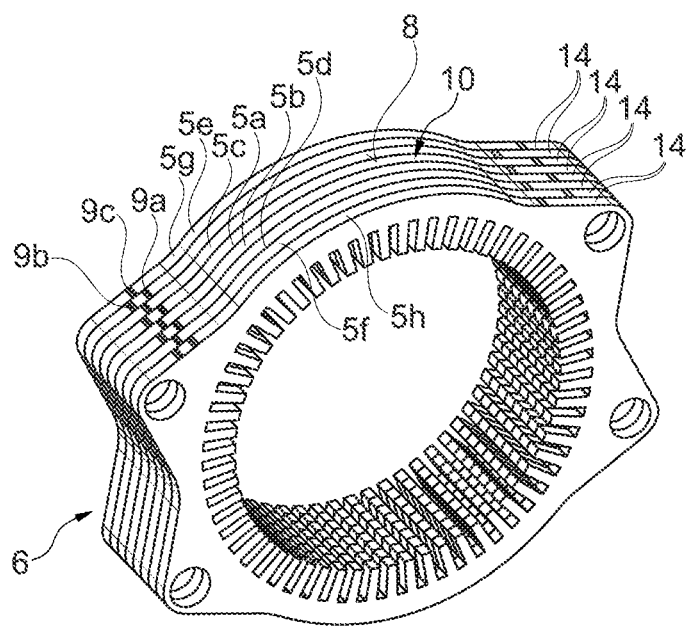
FIG. 8 shows a perspective view of a laminated core used in an electrical machine according to a second exemplary embodiment, which is now provided with four through-holes instead of the three through-holes present in the first exemplary embodiment.
Figure 10:
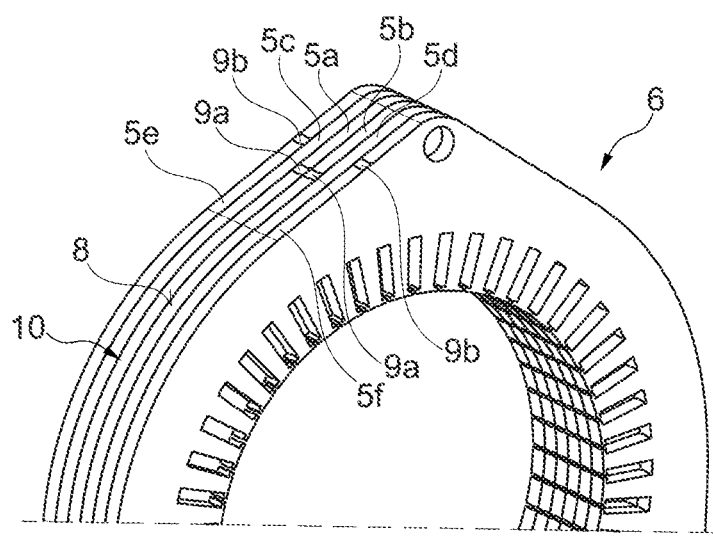
FIG. 10 shows a perspective view of a laminated core of a stator designed according to a third exemplary embodiment, which differs from the first exemplary embodiment with respect to the distribution and arrangement of the recesses on the outer periphery of the laminated core.
Figure 11:
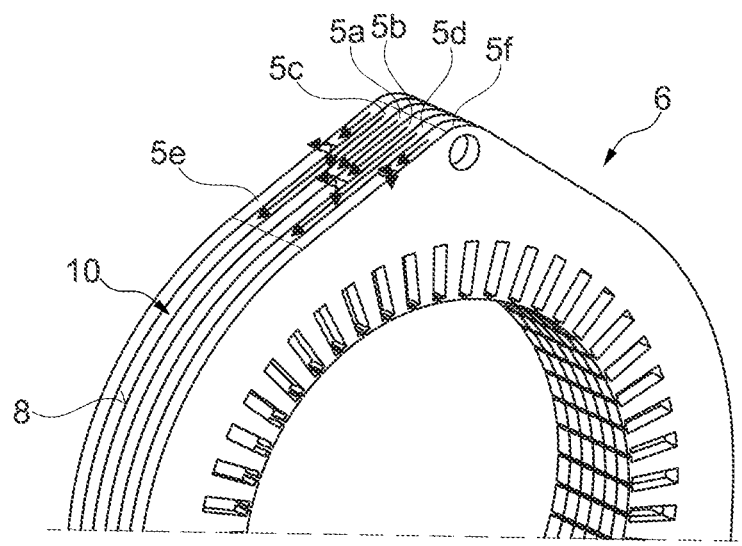
FIG. 11 shows a perspective view of the laminated core from FIG. 10, wherein arrows are now additionally drawn to illustrate the flow direction of the coolant guided along the outer periphery during operation.

FIGS. 8, 10 and 11 show two further exemplary embodiments of the electrical machine 1 according to the disclosure. In these figures, only the laminated cores 6 of the stator 3 are shown for the sake of clarity, wherein the further structure as well as the further mode of operation of the electrical machines 1 emerge from the first exemplary embodiment. For the sake of brevity, therefore, only the differences from the first exemplary embodiment are described below.

With the second exemplary embodiment of FIG. 8, a thicker laminated core 6 is realized. Eight partial stacks 14 are placed on top of one another. As can be seen in this context, the individual recesses 9a, 9b, 9c, 9d of the lamination segments 5a to 5h are arranged in the axial direction along a zigzag line. Furthermore, four through-holes 16a, 16b, 16c, 16d are even provided in this embodiment.

In conjunction with FIGS. 10 and 11, it can also be seen that the distribution of the recesses 9a, 9b, 9c, 9d can be optimized in other ways. Accordingly, in this third exemplary embodiment, the recesses 9a, 9b, 9c, 9d nearest to a common through-hole 16a, 16b, 16c, 16 replicate an arrowhead contour.

In other words, according to the disclosure, the outer contour is designed in such a way that, despite the process-related notches in the individual laminations 13, a liquid cooling medium can flow off along the flanks from top to bottom. The notches 9a, 9b, 9c, 9d should thus not deflect this coolant so that the coolant leaves the flanks in the axial direction. Since notches are essential, for example in conjunction with the punching of the sheets, they must be designed accordingly. However, the geometry of the notches can only be changed to a limited extent in terms of the depth and angle of the inlet. The advantage of this solution is that cooling with liquid medium without requiring additional components, such as a cooling jacket, is guaranteed, which keeps both the necessary effort and the costs low. In the figures, the special notch geometry and arrangement in the stator laminations 6 can be seen, which prevents the deflection of coolant at the stator flanks. In terms of the inventive solution, both the geometry and the positioning of the notches and the joining process are defined in such a manner that the cooling oil is not deflected axially to the outside and thus no longer contributes to cooling the flanks. In this case, a continuous notch along the entire active length must be prevented. This must be taken into account in the design of the individual lamination as well as in the joining process of the individual laminations to form the laminated core.

Figure 3:
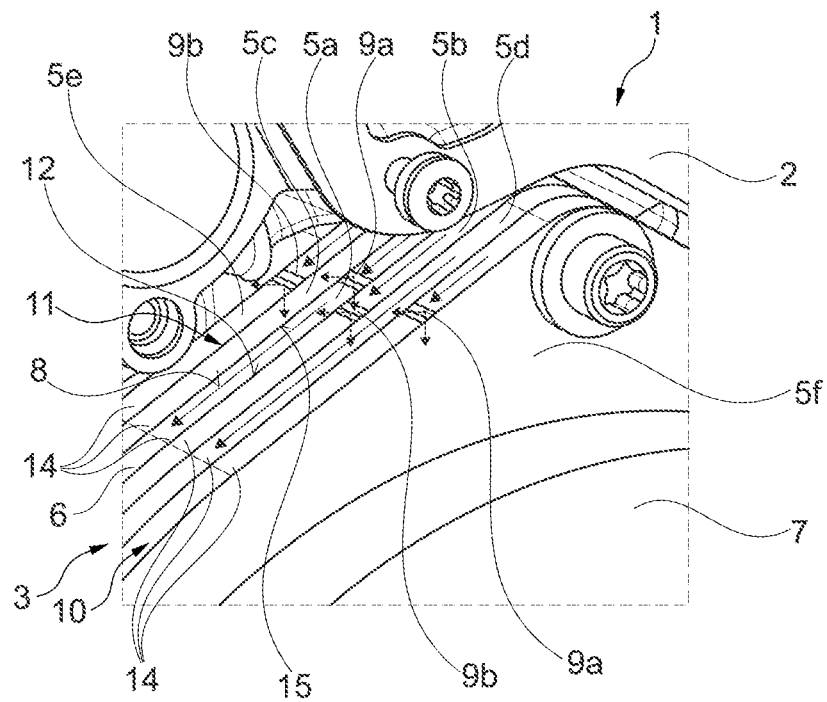
FIG. 3 shows a detailed perspective view of the region marked "III" in FIG. 2.

In principle, a deep and steeply tapering notch slows down an incoming liquid in a significant manner. To intercept as little oil as possible, the notch must be made as shallow as possible. A notch that is as wide and shallow as possible prevents the incoming coolant from accumulating. In addition, this weakens the capillary effect, and thus the axial deflection of the oil. An additional advantage of a shallow notch is the reduced loss of strength that results in this region. However, a certain inlet and depth of the notch must be ensured due to the punching process. Therefore, interception and capillary action cannot be prevented by the notch shape alone. Since axial deflection cannot be prevented by the geometry of the notch alone, additional precautions must be taken in this respect to prevent the coolant from running off the end faces. To prevent the liquid from running off to the side, the notch is interrupted along the active length in the laminated core. Due to this arrangement, several drops form in the many recesses when the oil runs in, and the axial walling prevents them from running off to the side. The collection and run-off of the cooling liquid in the preceding example is shown in FIGS. 2 and 3. Here it can be seen that, due to the large number of interruptions in the notches, axial run-off of liquid can only be expected in the outermost region. Most of the oil collects in the notches in the center of the flank and continues to run as it continues to accumulate. Overall, only a very small loss of coolant at the flank is to be expected. Furthermore, the part of the cooling oil that runs off axially at the end faces can be used for additional cooling of the copper wire winding, which would otherwise have to be cooled by other means. To achieve such an arrangement of recesses in the stator laminations, the notches must be placed accordingly in the individual lamination. If the notch positions were distributed evenly over the outer contour, completely continuous notches would be the result when stacking the individual laminations to form the core. The first step in solving this problem is to distribute the punching notches 9*a*, 9*b*, 9*c*, 9*d* unevenly. In order to obtain isolated recesses in the laminated core instead of continuous notches, the individual laminations must be rotated relative to one another when stacked. In the example with three bores 16*a*, 16, 16*c*, a threefold rotation, i.e. by 120° in each case, is possible; with four bores (FIG. 8), a twofold rotation by 180° in each case is possible. The stacking process can be freely varied during the joining process. For example, the lengths of the recesses can be varied by first forming smaller laminated cores of the same orientation with the sheets, which are subsequently joined together to form the overall laminated core. In FIG. 3, six smaller stacks were formed and then joined in a manner rotated in relation to one another to form the entire stator laminated core. Furthermore, the concept can be optimized by defining a predetermined stacking sequence to optimize the coolant flow along the stator flank. In FIG. 10, the stacking sequence has been defined such that the recesses are oriented toward the center of the stator like an arrow. This ensures that the coolant that is running off is also distributed more towards the center.

LIST OF REFERENCE SYMBOLS

1 Electrical machine
2 Housing
3 Stator
4 Rotor
5*a* First lamination segment
5*b* Second lamination segment
5*c* Third lamination segment
5*d* Fourth lamination segment
5*e* Fifth lamination segment
5*f* Sixth lamination segment
6 Laminated core
7 Wire winding region
8 Exterior
9*a* First recess
9*b* Second recess
9*c* Third recess
9*d* Fourth recess
10 Outer periphery
11 Coolant guide channel
12 End face of the second lamination segment
13 Individual lamination
14 Partial stack
15 End face of the third lamination segment
16*a* First through-hole
16*b* Second through-hole
16*c* Third through-hole
16*d* Fourth through-hole
17 Axis of rotation
18 Slot
19 Annular region
20 Fastening means
21 Sheet metal blank
22 Sheet metal strip
23 Point
24 Supply channel
25*a* First ramp surface
25*b* Second ramp surface

The invention claimed is:

1. An electrical machine for driving a motor vehicle, comprising;
a housing,
a stator, which is fixedly accommodated in the housing, and
a rotor, which is mounted rotatably relative to the stator,
the stator having a laminated core composed of a plurality of punched lamination segments and having a wire winding region connected to the laminated core, and each lamination segment of the plurality of punched lamination segments having, on its radial exterior, at least one radial recess formed by punching production, and a coolant guide channel being delimited directly by an outer periphery of the laminated core,
wherein the plurality of punched lamination segments comprises a first lamination segment and a second lamination segment,
wherein the first lamination segment comprises a first radial recess nearest to a first though-hole, wherein the first radial recess is arranged at a first distance from the first through-hole along the outer periphery of the laminated core,
wherein the first lamination segment further comprises a second radial recess nearest to a second though-hole, and wherein the second radial recess is arranged at a second distance from the second through-hole along the outer periphery of the laminated core,
wherein the first lamination segment further comprises a third radial recess nearest to a third though-hole, wherein the third radial recess is arranged at a third distance from the third through-hole along the outer periphery of the laminated core,
wherein the first distance is different from the second distance, wherein the second distance is different from the third distance, and wherein the third distance is different from the first distance, and
wherein the first radial recess of the first lamination segment of the plurality of punched lamination segments is spaced apart, along the outer periphery, from a fourth radial recess of the second lamination segment of the plurality of punched lamination segments directly abutting the first lamination segment in such a way that the first radial recess of the first lamination segment is at least partly axially covered by an end face of the second lamination segment.

2. The electrical machine according to claim 1, wherein at least one of the first lamination segment and the second lamination segment comprises a single individual lamination or a plurality of individual laminations stacked one on top of the other to form a partial stack.

3. The electrical machine according to claim 2, wherein the individual laminations of the lamination segments are designed as identical parts, wherein the individual lamination of the first lamination segment is rotated relative to the individual lamination of the second lamination segment.

4. The electrical machine according to claim 1, wherein the end face of the second lamination segment is a second end face, wherein a third lamination segment of the plurality of punched lamination segments likewise provided with a fifth radial recess is present, which abuts on an axial side of the first lamination segment facing away from the second lamination segment, wherein the fifth radial recess of the third lamination segment is spaced apart along the outer periphery relative to the first radial recess of the first lamination segment such that the first radial recess of the first lamination segment is axially covered by a third end face of the third lamination segment.

5. The electrical machine according to claim 4, wherein the third lamination segment comprises a single individual lamination or a plurality of individual laminations stacked one on top of the other to form a partial stack.

6. The electrical machine according to claim 4, wherein the first radial recess of the first lamination segment has a greater distance along the outer periphery to the first through-hole nearest thereto than the fifth radial recess of the third lamination segment.

7. The electrical machine according to claim 1, wherein each lamination segment of the plurality of punched lamination segments is provided with a plurality of recesses distributed along the outer periphery, wherein each recess of a respective lamination segment is arranged along the outer periphery spaced apart from individual recesses of an adjacent lamination segment.

8. The electrical machine according to claim 1, wherein a plurality of through-holes distributed along the periphery is provided in the laminated core, wherein the plurality of through-holes comprises the first through-hole, the second through-hole, and the third through-hole, wherein the first radial recess of the first lamination segment has a greater distance along the outer periphery from the first through-hole than the fourth radial recess of the second lamination segment.

9. The electrical machine according to claim 1, wherein more than three lamination segments are present.

10. The electrical machine according to claim 1, wherein a radial recess of a respective lamination segment has a depth that measures less than 60% of its width.

* * * * *